Patented Oct. 6, 1953

2,654,744

UNITED STATES PATENT OFFICE 2,654,744

β-(2-METHYLPIPERIDINO) ETHYLMETHYLPHENYLAMINE SALT OF PENICILLIN

Harley W. Rhodehamel, Jr., Indianapolis, Ind., assignor to Eli Lilly and Company, Indianapolis, Ind., a corporation of Indiana No Drawing. Application February 13, 1952, Serial No. 271,435

2 Claims. (Cl. 260—239.1)

This invention relates to a novel penicillin salt and the preparation thereof.

I have discovered that β-(2-methylpiperidino)-ethylmethylphenylamine or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The base of the salt-forming compound of this invention is represented by the following formula:

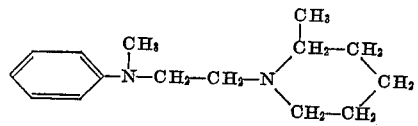

The following examples illustrate the preparation of the novel salt of this invention:

Example 1

To 3 g. of a solution of penicillin (e. g. a commercial mixture of the several penicillins) dissolved in 50 ml. of amyl acetate are added 3 g. of β - (2 - methylpiperidino) ethylmethylphenylamine dissolved in 20 ml. of amyl acetate. The mixture is cooled and stirred occasionally whereupon the β - (2 - methylpiperidino) ethylmethylphenylamine salt of penicillin precipitates. The salt is isolated as by decantation or filtration, and dried in vacuo.

Example 2

To an aqueous solution of 0.3 g. of the potassium salt of penicillin G in 1.8 ml. of water is added a solution of 0.3 g. of β-(2-methylpiperidino) ethylmethylphenylamine dihydrochloride in 5 ml. of water. The mixture is cooled and stirred occasionally whereupon the slightly soluble β-(2-methylpiperidino) ethylmethylphenylamine salt of penicillin G precipitates. The salt is separated, and dried in vacuo.

The preparation of β-(2-methylpiperidino)-ethylmethylphenylamine can be accomplished by the condensation of methyl aniline with 2-methylpiperidinoethyl chloride in toluene solution, in the presence of anhydrous potassium carbonate. The acid addition salts of β-(2-methylpiperidino) ethylmethylphenylamine are prepared by the usual methods, as, for example, by interreaction of equivalent amounts of the base and the selected acid in inert solvent solution, followed by removal of the solvent.

I claim:

1. A salt having as its components penicillin and β-(2 - methylpiperidino) ethylmethylphenylamine represented by the formula:

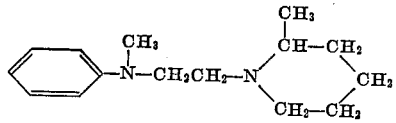

2. The β - (2 - methylpiperidino) ethylmethylphenylamine salt of penicillin G.

HARLEY W. RHODEHAMEL, Jr.

References Cited in the file of this patent

UNITED STATES PATENTS

| Number | Name | Date |
|---|---|---|
| 2,579,185 | Granatek | Dec. 18, 1951 |
| 2,585,239 | Granatek | Feb. 12, 1952 |

OTHER REFERENCES

British Report CMR–Br. 234 (PB 79,927), December 5, 1947, p. 3.